M. J. STACK.
MEANS FOR FOLDING, CUTTING, AND ROLLING COTTON BATTING.
APPLICATION FILED MAY 8, 1916.

1,196,993.

Patented Sept. 5, 1916.
9 SHEETS—SHEET 1.

INVENTOR
M. J. Stack.
BY
Fred G. Dieterich & Co
ATTORNEYS

M. J. STACK.
MEANS FOR FOLDING, CUTTING, AND ROLLING COTTON BATTING.
APPLICATION FILED MAY 8, 1916.

1,196,993.

Patented Sept. 5, 1916.
9 SHEETS—SHEET 2.

INVENTOR
M. J. Stack.
BY
Fred G. Dieterich & Co.
ATTORNEYS

M. J. STACK.
MEANS FOR FOLDING, CUTTING, AND ROLLING COTTON BATTING.
APPLICATION FILED MAY 8, 1916.

1,196,993.

Patented Sept. 5, 1916.
9 SHEETS—SHEET 4.

INVENTOR
M. J. Stack.
BY
Fred G. Dieterich &Co.
ATTORNEYS

M. J. STACK.
MEANS FOR FOLDING, CUTTING, AND ROLLING COTTON BATTING.
APPLICATION FILED MAY 8, 1916.

1,196,993.

Patented Sept. 5, 1916.
9 SHEETS—SHEET 6.

Fig. 7.

INVENTOR
M. J. Stack.

BY
Fred G. Dieterich &Co
ATTORNEYS

M. J. STACK.
MEANS FOR FOLDING, CUTTING, AND ROLLING COTTON BATTING.
APPLICATION FILED MAY 8, 1916.

1,196,993.

Patented Sept. 5, 1916.
9 SHEETS—SHEET 8.

INVENTOR
M. J. Stack.
BY
Fred G. Dieterich & Co.
ATTORNEYS

UNITED STATES PATENT OFFICE.

MAURICE J. STACK, OF COHOES, NEW YORK.

MEANS FOR FOLDING, CUTTING, AND ROLLING COTTON-BATTING.

1,196,993.      Specification of Letters Patent.      Patented Sept. 5, 1916.

Application filed May 8, 1916. Serial No. 96,157.

*To all whom it may concern:*

Be it known that I, MAURICE J. STACK, residing at Cohoes, in the county of Albany and State of New York, have invented a new and Improved Means for Folding, Cutting, and Rolling Cotton-Batting, of which the following is a specification.

My present invention has reference to means for handling cotton batting and which operates to fold the bat into shape and prepares the same for use as comforters, mattresses and other commercial needs; that winds the folded bat into rolls of desired sizes, intermittently severs the bat sheet as it passes to the winding or rolling up devices and discharges the bat roll laterally from the machine, into a suitable receiver.

In the practical application of my present invention, the general steps or method of handling the bat, as it passes to the folding, severing and rolling or winding elements, (as the bat continuously comes from the garnetts or cards, is substantially the same method of handling the stock, that is disclosed in my Patent No. 1,053,544 dated February 18, 1913, for means for folding and rolling up cotton batting.

In the utilization of cotton bat handling mechanism that embodies the generic combination of parts, such as are in my patened means mentioned, all of the practical results desired, in the handling of cotton batting are not attained, particularly, since in working different sizes of batting, it is necessary to adjust the operative parts to suit the particular size of bat to be worked, which results in a great loss of time and considerable trouble in effecting the necessary adjustments of the machine.

One of the objects of my present invention is to provide, in a machine of the general character stated, means whereby a change from four ounce rolls to a roll of sixteen ounces (a change very difficult to provide for with the means shown in my patent) can be readily made without stopping all the coöperating parts connected with the bat head mechanism.

As is well known, to those skilled in the art to which my invention relates, some manufacturers of cotton batting use five garnetts or cards in one line to make a commercial cotton bat with a production from each machine, from 800 to 1,000 pounds. In a working time of ten hours, the speed of the cotton from the garnetts or cards is never changed, no matter what size roll the bat head mechanism is set for.

In the use of machines, such as is shown in my patent mentioned, a different power transmission gear, must be provided for each different size roll to be made,—for example—a gear with 50 teeth is used when an eight ounce roll is to be made, and a gear with 100 teeth used when a sixteen ounce roll is to be made, it being understood that the gears put on for the different size rolls are the drivers to all the cams and automatically actuating parts, it being also understood that with each change of gear, a different speed is developed, and as the cotton coming from the garnetts or cards is always fed at the same speed it is necessary to stop the entire machine and to set the cams and automatically operating parts to take care of the cotton as it comes in uniform speed, from the garnetts or cards.

Another and essential object of my present invention is the provision of an improved coöperative arrangement of parts, particularly designed to overcome all of the objections above noted and that operates for producing the bat rolls, no matter what size, without the necessity of changing gears, and in which the shifting or changes required for the different sizes of rolls is automatically effected without losing a roll of bat,—an important advantage in the art of making commercial cotton bats, automatically. Again, my invention seeks to provide an improved mechanism of the character stated which will accurately sever the batting into equal lengths, and for the particular weight of bat roll for which the mechanism is running, and then roll the different lengths while the feeding of the bat continues. In some bat rolling mechanisms, of the general character before outlined, the batting is severed by a reciprocable or plunger blade, that extends transversely of the batting and which, at predetermined intervals, moves down through the said batting. From practical experience I have found, that folded cotton cannot be satisfactorily or accurately severed by a cutter of the kind stated, when the folded stock travels at the speed the cotton must travel in making cotton bats.

Another object of my present invention therefore lies in the provision of an improved cutting means that includes a reciprocating blade and devices for effecting a certain tension or stretch at that part of the traveling bat, to be engaged by the cutter, to thereby effect a positive break or severance of the bat at the cutting point and at the same time wipe or clear the stock from the cutting blade to thereby leave the front end of the incoming bat in shape for being properly gripped and continued in its infeed or forward direction.

With other objects in view, all of which will be hereinafter mentioned, my present invention embodies, in a means or machine of the character stated, an improved coöperative arrangement and combination of parts adapted to operate for all sizes of commercial bats, and which folds the bat and conveys it along through the bat head mechanism, severs the folded bat into such predetermined lengths for which the operative parts may be set, winds the bat lengths into rolls and discharges the roll from the machine, the operative parts being entirely automatic in their action, all of which will be hereinafter fully explained, specifically pointed out in the appended claims and illustrated in the accompanying drawings, in which:—

Fig. 13 is a detail plan view of the cam or control wheel, the rocker arm 94, the slidable rack shifting gear with the adjustable stop or pointer, and the reversibly shifting worm gear hereinafter specifically referred to. Fig. 14 is a detail cross section on the line 14—14 on Fig. 13 of the devices shown in Fig. 13. Fig. 15 is a diagrammatic section that illustrates the bat end throwing arm in position for throwing the bat end over the bat winding roller, see arrow $y$. Fig. 16 is a similar view, the bat throwing arm being back to normal position and the bat shown as winding on and raising the bat roller.

Figure 2:
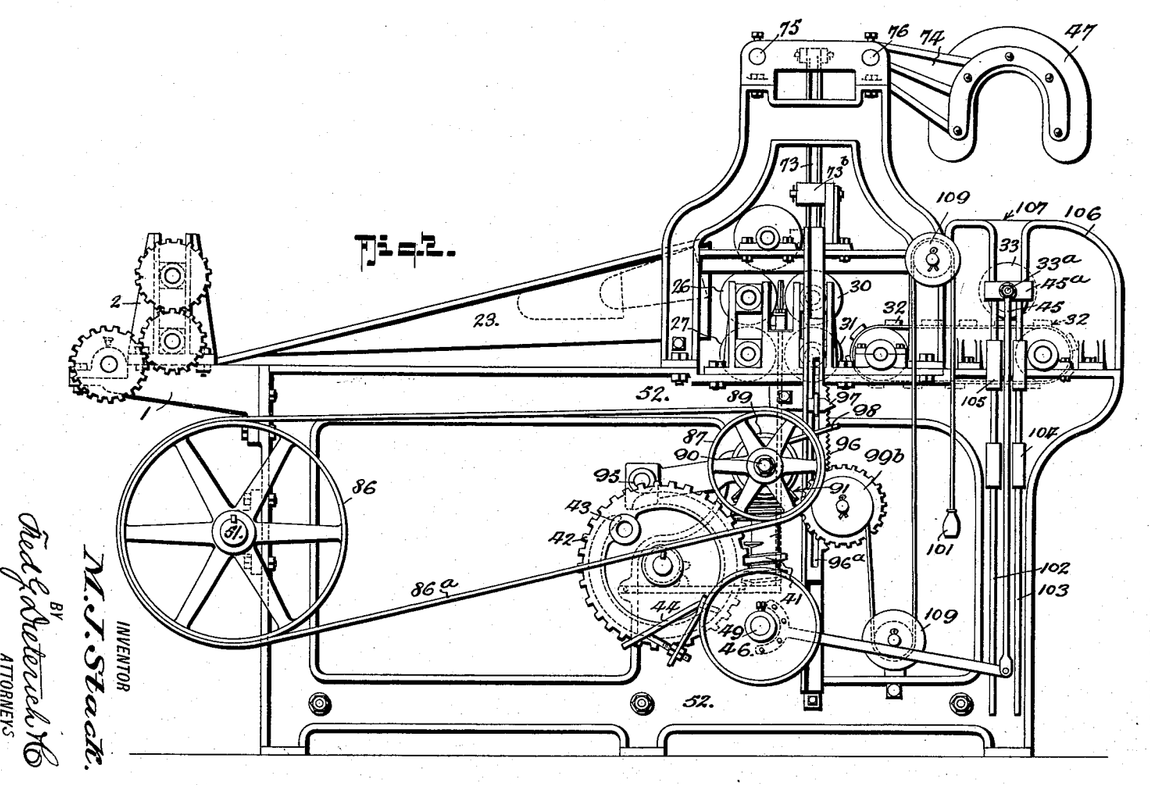
Fig. 2 is a left hand elevation thereof, the coöperative parts being relatively so positioned to have the bat take up roll at the lowermost position ready for taking on the free or incoming end of the bat.

In my present machine, all of the operative elements are mounted on a suitable framing, the general arrangement of which is clearly shown in the drawings and on the front end of said frame, in a pair of forwardly extended brackets 1—1, is mounted a roll 20, over which passes the feed apron 20ª that takes the carded stock from the garnetts (not shown) and continuously feeds said stock to a pair of pressing rolls 21—22 located one below the other, in vertically slotted bearings 2—2, mounted on the brackets 1—1 and which are geared with each other and with the roll 20 in the manner best shown in Fig. 2 and hereinafter further referred to.

The pressed stock, as it passes from the rolls 21—22, is fed in a bat shape to the folding devices, which may be of any approved construction, preferably, however, as shown, and which includes oppositely disposed folder horns 24—25 that turn over the opposite edges of the bat on to the central portion thereof to impart the desired commercial shape to the bat ready for passing to the severing devices that successively cut the bat into uniform lengths to be handled by the rolling up mechanism and which, when in the completed roll shape, is ejected from the said rolling up mechanism.

The commercially shaped bat, during the operation of the machine, is continuously fed between a pair of opposing intake or feed rollers 26—27 and from thence between a pair of feed and delivery rolls 30—31, the two sets of rolls 26—27 and 30—31 being in the same horizontal plane and extend across between the opposite sides 52—52 of the main frame, one set of such rolls, 26—27, being located in advance of the other set 30—31, located beyond the bat severing devices, the peculiar construction of which and the coöperative relation with the two sets of rolls forming an essential feature of my present invention.

It is well known that folded cotton cannot be cut or severed with a reciprocating or plunger blade, particularly when the folded stock moves at the speed that it must travel in making cotton bats, for the reason that after severing the bat the cutter blade tends to carry the incoming end of the severed bat up with it and consequently out of position for passing over to the receiving rolls 30—31.

Figures 6, 8:
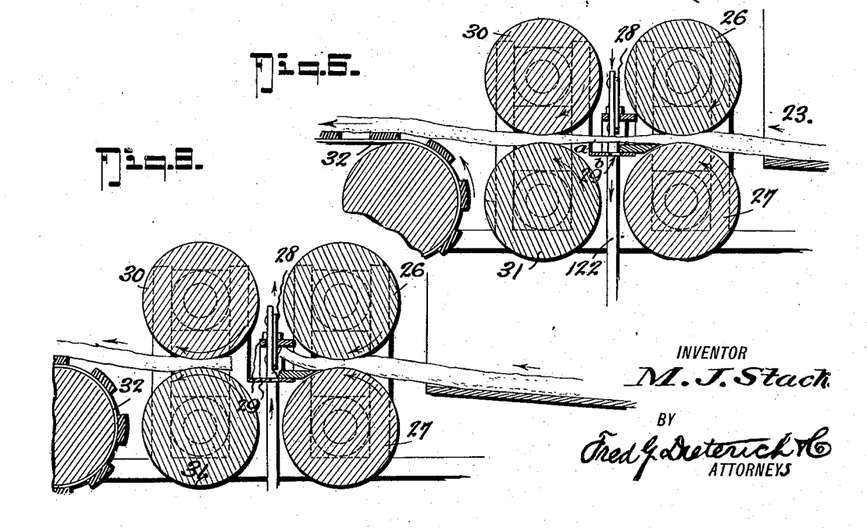
Fig. 6 is a detail cross section of the two sets of rolls that engage the bat, the cutting blade and its carrying head, the blade being shown as just coming down onto that portion of the bat under tension that renders it in shape for being readily severed, as the cutter engages it.
Fig. 8 is a detail cross section of the bat severing mechanism taken substantially on the line 8—8 on Fig. 7 and illustrates the wiping means for cleaning the blade.
Figure 7:
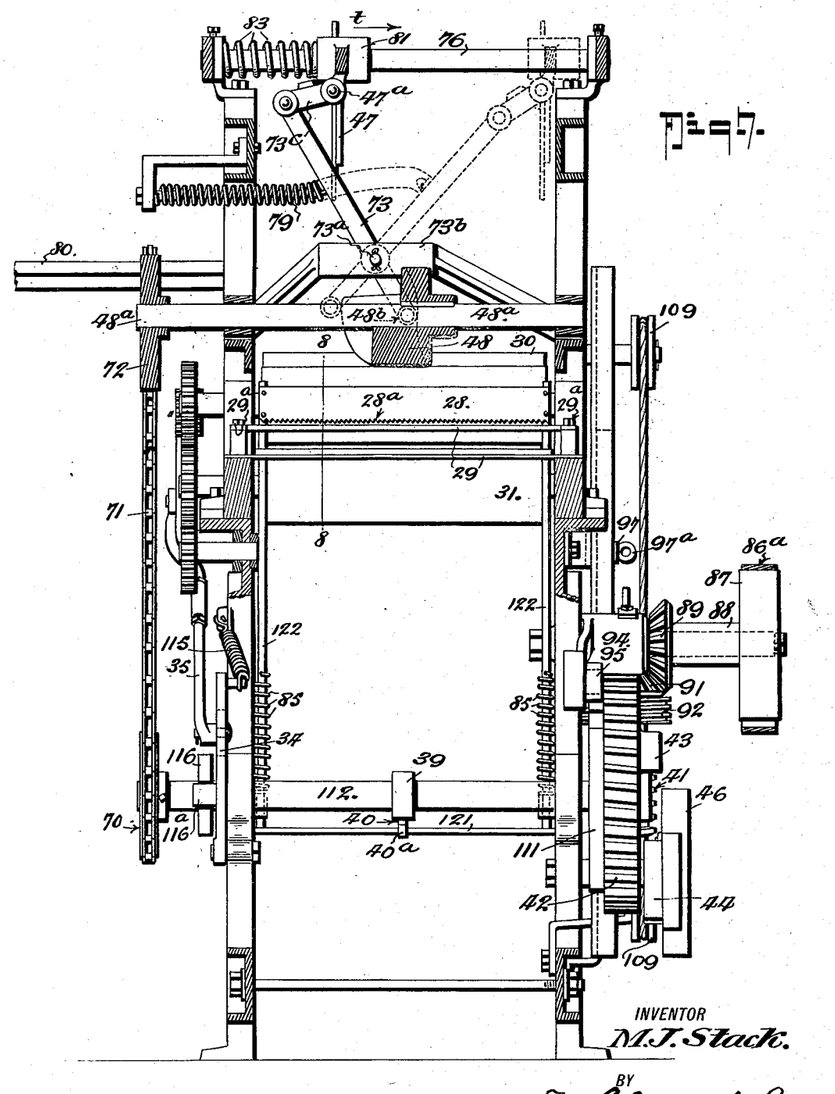
Fig. 7 is a transverse section of the machine taken substantially on the line 7—7 on Fig. 1.

Furthermore in severing the folded or commercial bat with a plunger knife, the line of separation is frequently ragged and incomplete, or in other words, a clean cut is not always had. In my present construction of bat severing means, best shown in Figs. 4, 6, 7 and 8, special provision is made for wiping the incoming end of the bat off the cutter blade 28 to permit such end to drop back in alinement with the contacting or gripping surfaces of the rolls 30—31, and to such end the severing edge 28$^a$ is preferably saw toothed, has its opposite ends secured to the upper ends of a pair of plunger rods 122—122 connected at the lower end to a cross rod 121 that connects to the outer end of a hinged lever arm 40$^a$ provided with a cam lug 40 adapted to be engaged, at predetermined intervals, by a cam 39 fixedly mounted on a driven shaft 112 that extends transversely of and has its ends journaled in the frame sides 52, as shown. By referring to Figs. 6, 7 and 8 it will be seen the upper and lower horizontal guide bars, 29—29 of the cutter frame are mounted on the upper horizontal portions 69 of the frame side to which they are fixedly attached by the screw studs 29$^a$—29$^a$ and the said bars 29—29 are provided with elongated slots 29$^b$—29$^b$ through which the cutter blade passes as it is pulled down to effect the bat severing operation, as will be presently more fully explained.

As before stated, it has heretofore been difficult to effect a clean and positive severance of a folded bat with a plunger or blade, when the bat is traveling at the speed necessary for being handled by the bat head mechanism. To insure a perfect cut of the bat, I provide for imparting different speeds to the moving bat, that is, in my mechanism the rolls 30—31 travel at a greater speed than do the rolls 26—27, the said rolls 30—31 in the showing thereof in the drawing, running one tooth faster than the rolls 26—27, which difference in the speed of the two sets of rolls effects an increased tension on that part of the bat between the front and back set of rolls and indicated by $a$ on Fig. 6, which draws the bat to a more rigid or contracted condition, so that as soon as the cutter 28 touches it, the bat is severed, the increased pull tension on that end of the bat engaged by the rolls 30—31 tending materially to aid in pulling the bat apart, it being also apparent, by referring to Fig. 8 that as soon as the cutting knife is returned to its upper position, which is effected by the pusher springs 85—85, secured on the rods 122 and the frame of the machine, see Fig. 4 as the cutting edge recedes up through the lower slotted guide 29$^a$, the front end of the bat is wiped from the blade and dropped into position for being passed to the rolls 30—31, see Fig. 8 the severed bat section being at the same time conveyed onto an endless apron 32 that carries the stock under a shiftable bat roll 33, the general arrangement of and its operative connection with the driving power of the machine being best shown in Figs. 2 and 3, and that the construction and manner of operation of the bat roll and its actuating devices be readily understood, it should be stated that when the end of the folded bat section is out over the apron 32 long enough to fold over the bat take-up roll 33, the said end is automatically carried over the said roll 33 and in position to wind thereon to whatever weight the bat winding mechanism may be adjusted.

Figure 9:
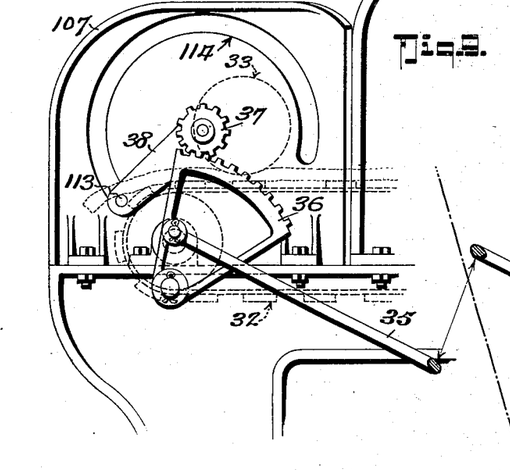
Figs. 9, 9ª, and 10 and 10ª are enlarged side elevations of means for operating the throw device that puts the loose end of the cotton bat over the bat winding roll, and the cam devices that operate the said throw device, at predetermined intervals.
Figure 9A:
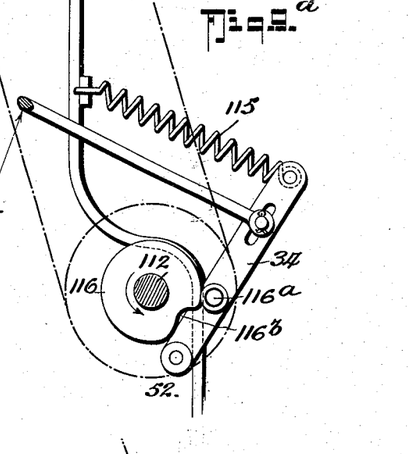
Figure 10:
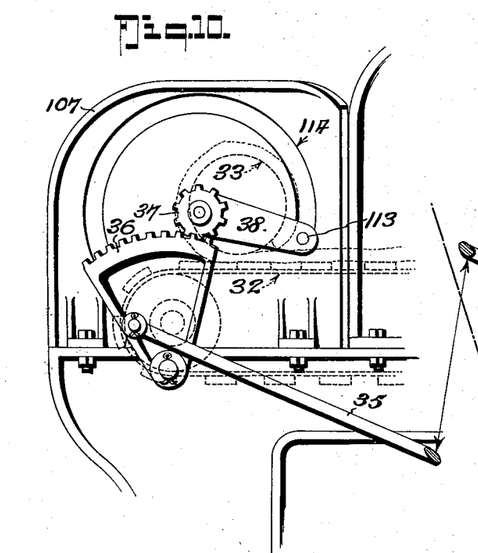
Figure 10A:
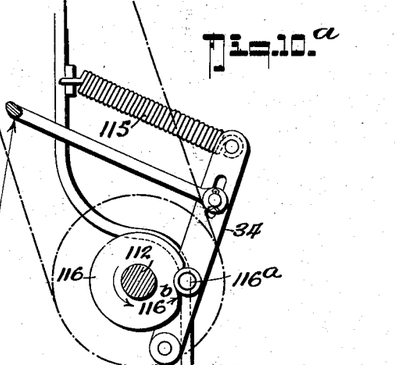

By referring now more particularly to Figs. 9, 9$^a$, 10 and 10$^a$ it will be seen a cam 116 on the driven shaft 112 is provided for intermittently engaging with a lever 34 that is pivotally mounted at the lower end on the frame 52 and which carries a roller stud 116$^a$ that rides on the periphery of the cam 116 and at each revolution of said cam moves into the cam notch 116$^b$ into which it is projected by a coiled spring 115 connected to the upper end thereof and to the main frame, as shown.

Figures 13, 14, 15, 16:
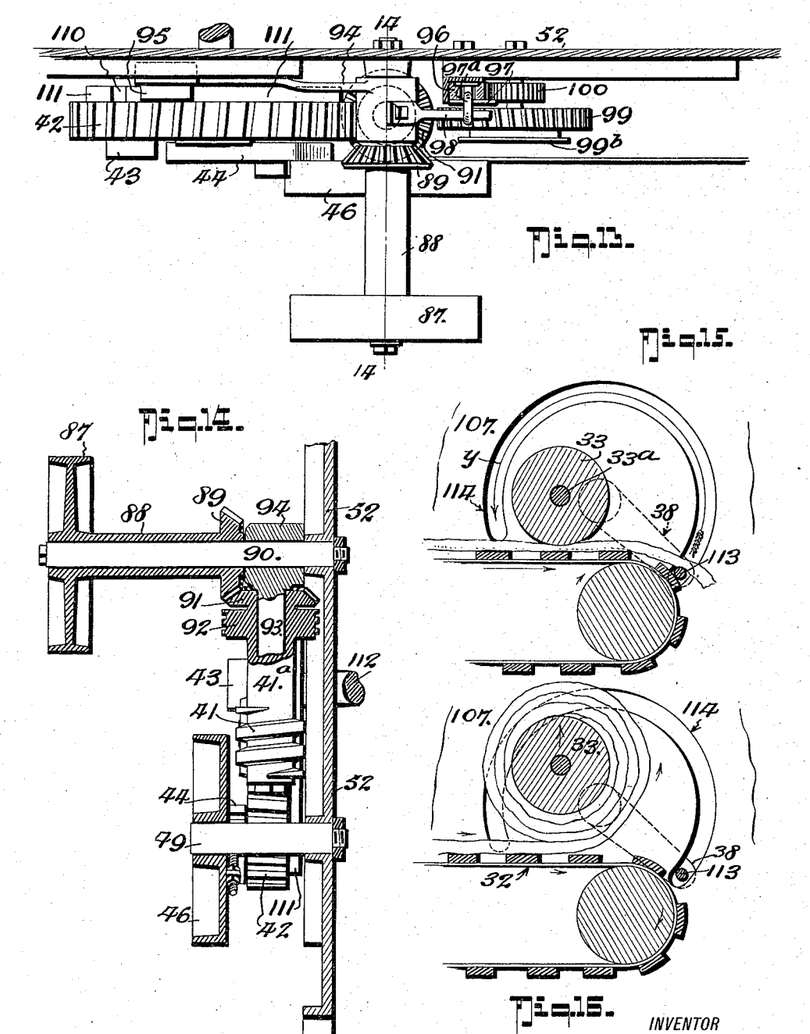

36 designates a sector or cam gear mounted on a stud projected from the main frame and which is held in mesh with a gear 37 that is rockably mounted on a side frame member 107 adjustably mounted on the rear end of the frame side 52. Gear 37 is fixedly attached to an arm 38 which carries a throw rod 113 that extends through a segmental slot 114, concentric with the axis of the arm 38 and which, when actuated by the cam 116, through the connecting rod 35, throws the loose end of the bat over the roll 33, in the direction of the arrow $y$, see Fig. 15.

Since the construction of and the manner of operation of the mechanism for throwing the loose end of the bat over the winding or bat take-up roll 33 is substantially the same as that shown and described in my patent hereinbefore mentioned, further detailed description of such mechanism is not necessary.

As before stated, in the practical use of bat winding or rolling up mechanisms such as is disclosed in my patent hereinbefore mentioned, when it is desired to change the machine to wind up a bat roll of a different weight than for which the machine was adjusted, it is not only difficult to effect the necessary adjustment, but the stopping of the entire mechanism connected to the bat head is required. In my present commercial bat handling machine, the change in adjustment of the mechanism to adapt the same to wind up the bats in rolls of different weight is accomplished without the necessity of stopping the machine or shifting any of the operating cams.

Figure 11:
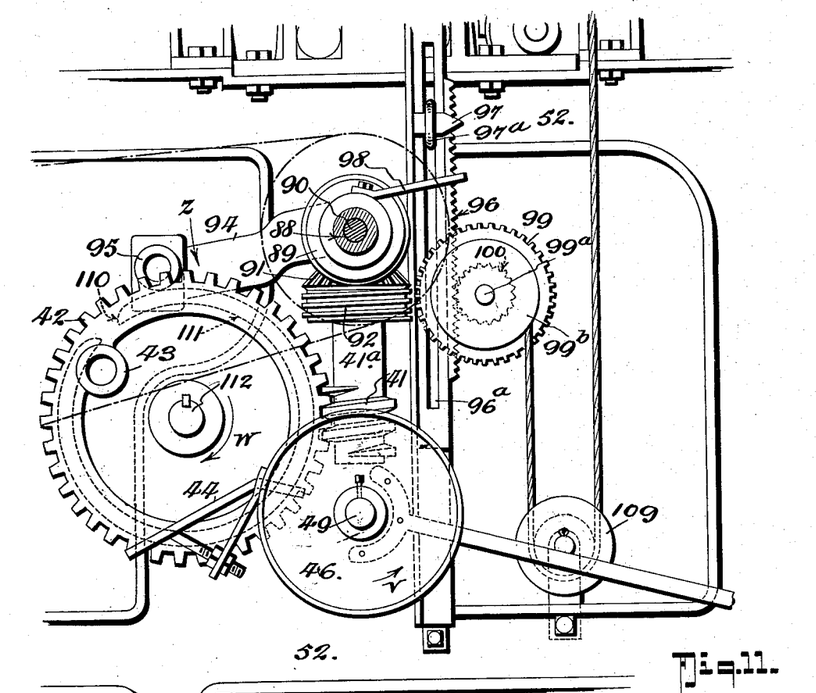
Fig. 11 is an enlarged side elevation of the constantly operating mechanism that automatically operates to intermittently set in operation the bat severing, the bat rolling or winding means, the bat roll lifter devices and the bat roll ejecting mechanism, as the bat continues in its infeed.
Figure 12:
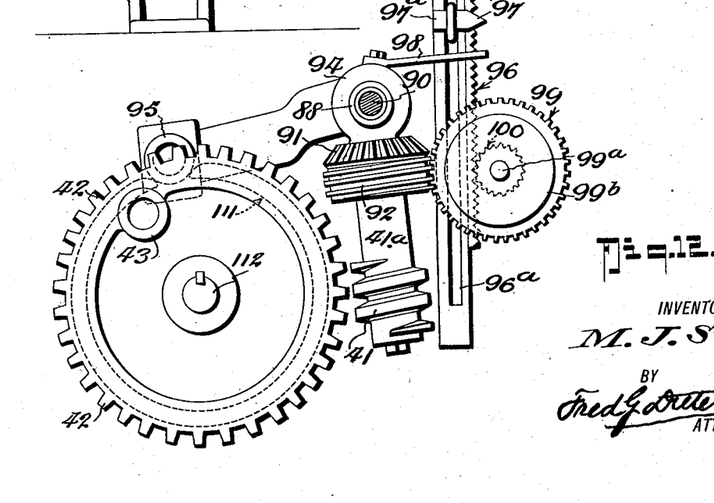
Fig. 12 is a side elevation of the automatically actuated timing mechanism for temporarily cutting out the means that bring into action the cutting devices, the roll winding and lifting and the roll ejecting means, the adjustable device, the setting of which governs the said timing mechanism, being also shown.

Referring now to Figs. 11 and 12, which clearly illustrate the mechanism that automatically operates to cut the bats in the required lengths, for building up rolls of different weights and for positioning the bat rolls, either of the smaller or larger diameters to be engaged at proper predetermined times by the ejecting mechanism hereinafter fully explained, 42 designates a gear keyed to cross shaft 112 and which, at proper times, turns the said shaft 112 and through the movement of such shaft 112, turns sprocket gear 70, chain belt 71 and gear 72 on a shaft 48ª that carries a cam 48 that operates the ejecting devices hereinafter described. Gear 42 and shaft 112 are intermittently operated and motion is transmitted to the said gear by a worm gear 41 formed on a sleeve 41ª that also has a worm gear 92, sleeve 41ª runs loose on a stud 93 which is a pendent part of a rocker arm 94 pivotally mounted on a stud 90 fast to side frame 52. Arm 94 includes a weighted end that carries a roller 95 which, by the weight of the arm 94 is caused to always ride on an annular rim 111 on the back face of gear 42, that has a cam cavity 110 into which the roller 95 drops when the said cavity 110 comes around to the said roller, and since the arm 94 rocks in the direction of arrow z on Fig. 11, when the roller 95 seats in the cavity 110 and the stud 93 rocks with it, the worm gear 41 is now moved out of mesh with gear 42 and the worm 92 brought into mesh with a worm gear 99, loosely mounted on a stud 99ª on the side frame 52. Gear 99 has a hub-like gear portion 100 that meshes with a toothed rack 96 vertically slidable in suitable ways on the framing, and formed with a vertically elongated slot 96ª that receives a thumb screw 97ª on a combined pointer and stop finger 97, the purpose of which will presently appear.

The shiftable bat take-up roll 33 is journaled on a rod arm 33ª clamped to a cross head 45ª on the upper end of a lifting lever 45 and on the upper end of a pair of rods 102—103 guided in cross bearings 104—105, that steady the vertical movement of the bat roll 33. Gear 42 carries a roller cam 43 located just to the rear of the cam seat 110 and the said cam 43, as the gear 42 is turned in the direction of arrow w on Fig. 11, engages a cam 44 that connects with and extends tangentially from a disk 46 loosely mounted on a stud 49 fast on the side frame 52.

It should be here stated that the several parts, gear 42, cams 43—44 and the disk 46 are coöperatively so connected and timed in their operation, that when the bat section, of predetermined length, has been wound on the roll 33, the gear 42, turning in the direction indicated, brings its cam 43 into engagement with cam 44 connected to disk 46, and thereby turns the said disk in the direction of the arrow V, swings the lever 45 in corresponding direction and thereby lifts the roll 33 with the wound bat, up into position so that the ejector device 47, presently again referred to, can wipe the roll of batting endwise off the roll 33, it being understood that after the cam roller 43 has tilted the cam 44 to impart the rotation to the disk 46, necessary to lift the bat roll 33 to the ejecting position stated, the said cam roll 43, (by reason of the cam member 44 extending beyond the vertical axis of the shaft 12) for a short time remains in contact with the cam member 44 and as the said roll begins on the up movement, it allows the cam member 44 to gradually rise and the disk 46 thereby gradually turn to its backward or normal position, and thereby causes the roll 33 to slowly drop down and thereby keep such roll 33 from coming down heavy on the bat conveying apron.

Motion is transmitted to operate the gear 42 and shaft 112 by an endless belt 86ª that passes over a driven pulley 86 on a driven shaft 51 that carries a fast and a loose pulley 49—50, and the said belt 86ª takes around a pulley 87 fast on a bushing 88 that runs loose on a stud 90 projected from the frame side 52, and which also has a bevel gear 89, that meshes with the gear 91 on the sleeve 93.

As before stated, after the gear 42 and its coöperative parts have completed a cycle of movement, at which time the roller 95 on arm 94 drops into cam seat 110 and throws gear 41 out of mesh with the gear 42 and at the same time the worm 92 into mesh with worm 99, and in consequence the operative parts controlled by gear 42 and shaft 112 remain stationary, and, it is when the said parts are thus inert, that another length of bat is fed through the bat advancing rolls 26—27 and 30—31. At this point it should be stated, the length of time the said parts remain inert is governed by the set of the stop finger 97, relatively to a heel-like extension 98 on the rocker arm 94, it being understood that when the said finger is set some distance on the slidable rack, up from the extension 98, the longer will be the bat section that is to be wound upon the roll 33. When the gear 42 is out of action and worm 92 engages worm gear 99, the gear 100 engages rack 96 and pulls it down until the finger 97 engages the extension 98 of the rocker arm 94, which now lifts the roller 95, at the heavy end of the arm, out of the cam seat 110 and thereby rocks lever 94 to shift the gear 41 back into mesh with gear 42 and simultaneously release gear 92 from gear 99, thereby setting the automatically actuating devices, that control the cutting of the bat into different lengths for which the pointer arm 97 may be adjusted, and for bringing into action the ejector devices, back into operative condition. After the gear 92 is disengaged from the gear 99, the said gear and its coacting gears are turned back by the counterpoise 101 on a cable that passes over the guide pulleys 109—109 and winds on a drum 99$^b$, as shown.

Figure 5:
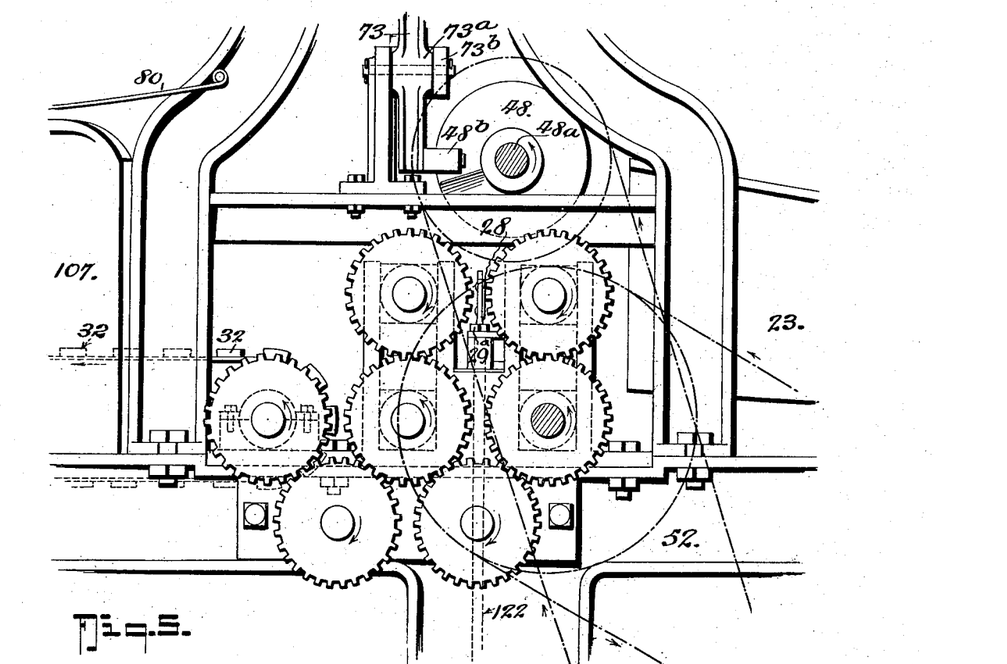
Fig. 5 is an enlarged end elevation of the two coöperative sets of bat gripping and feeding rolls, the severing cutter carrying frame and cutter in the operative position between the said sets of rolls, the transmission gear connections that drive the said sets of rolls at relatively different speeds of rotation, being also shown.

The ejector mechanism in my present machine for working commercial batting into rolls of predetermined weights and sizes, embodies substantially the same general arrangement of the like means disclosed in my patented machine. In my present machine, the said ejector mechanism includes a rocking lever 73 fulcrumed at 73$^a$ on a standard 73$^b$ (see Figs. 5 and 7) and the said lever, which is mounted to rock transversely of the machine, has its upper end pivotally connected to a link arm 73$^c$ which in turn pivotally connects to a cross pin 47$^a$ joined with the apertured ear on that part of the ejector arm located between the bearings 81—82, as is clearly shown in Fig. 4. The lower end of the lever 73 carries a roller stud 48$^b$ that normally projects in the path of an angular shaped cam 48 that rotates with the shaft 48$^a$.

Figure 3:
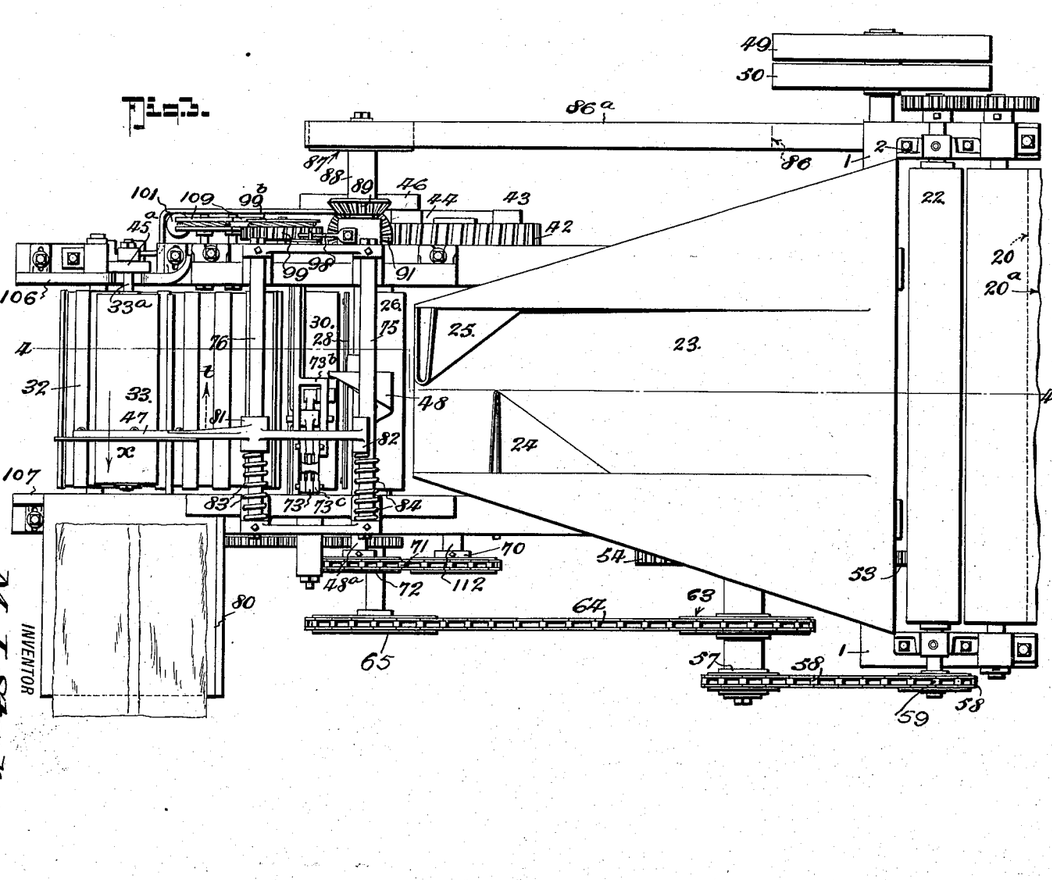
Fig. 3 is a top plan view of my improved machine, the parts being positioned to indicate the ejecting mechanism as moving in the direction indicated by the arrow $x$ to eject the wound bat roll from the take-up bat or winding roll.
Figure 4:
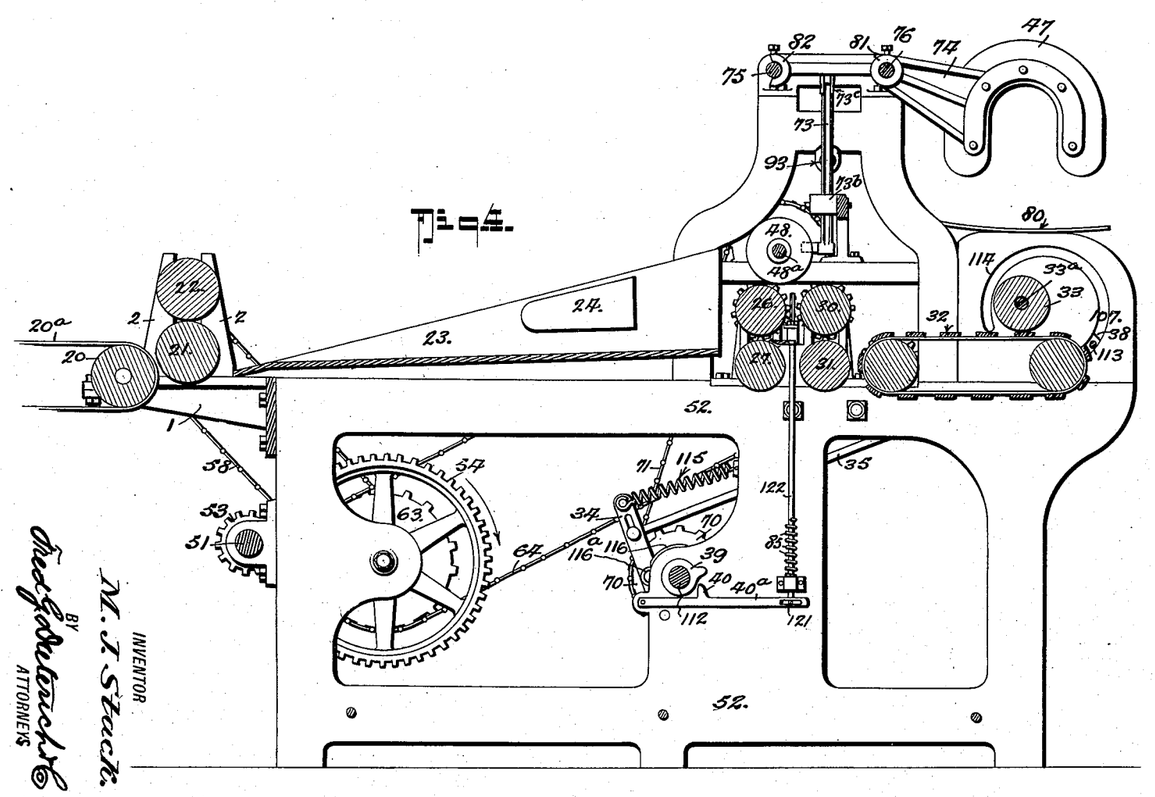
Fig. 4 is a vertical longitudinal section taken on the line 4—4 on Fig. 3.

In my present construction, cam 48 is timed to engage the lever 73 to shift the arm 74 and the ejector head 47 (that throws off the bat roll) in the direction of the arrow $t$ on Fig. 3, so as to store up tension in coiled spring 79, located midway of cross shafts 75—76, so that, when the cam 48 has completed its operation and the lower end of the lever 73 is thereby released, through the stored tension of spring 79, the arm 74 and throw off 47 are quickly moved in the direction of arrow $x$, the head 47 at this time wiping the bat roll from the roll 33 and discharging the bat roll into a receiving pan 80, it being understood that as the arm 74 of the ejector devices is impelled by the spring 79 it slides on the shafts 75—76.

83—84 are springs on the back end of the shafts 75—76 to cushion and relieve the blow from spring 79, and said springs 83—84 by reason of the sudden recoil of the arm 47—74 materially aid in effecting a quick rejection of the bat roll from the roll 33.

As the lever 73 moves arm 74 and head 47 to one side of the frame (see dash line on Fig. 3), the bat roll 33 can freely rise up with the roll of batting in proper position to be engaged by the ejector head.

Side frame portions 106—107 are adjustably mounted in the frames 52—69 so they may be set to the width of any commercial bat required. Pulleys 86—87 actuated from a prime mover run all the time, when the machine is in operation, and by reason thereof keep the gears 89, 91 and 41 turning also. Cam roller 95 drops into the cam seat 110 every time that gear 42 makes a complete turn, and as the said gear 42 continues in its movement, the roller 95 rises out of the seat 110 and again engages the rim 111, it being held in engagement with the said rim by its own weight. When the said roller 95 drops into the cam seat 110, as before noted, it rocks the gears 41 and 92 to the position shown in Fig. 12 and thereby separates gear 41 from 42 and by the same operation causes gear 92 to mesh with gear 99, and since gears 99 and 100 are on the same stud, gear 100 works the gear rack 96 to bring the adjustable pointer, (the set of which governs the timing of the automatically operating devices that control the intervals between the bat severing operations, the rolling up of the severed bat section, the lifting of the bat roll and the bat roll ejecting means,) into engagement with the lever 94 to release gear 42 so the said automatic operations may be repeated.

In my present construction of bat handling machine, the severing mechanism operates to cut the in-feeding bat into the desired lengths before rolling up the bat end and in that respect it differs from the construction shown in my patented machine, since in the patented construction, the bat end that is rolled is severed after it has been rolled.

By reason of providing for severing the bat end before rolling, a simple and effective means is employed in my present machine, adapted for being operated at different intermissions of time to vary the length of the bat end to be cut off, so that rolls of different weights may be provided for without changing of any of the geared up parts or operating cam devices.

Figure 1:
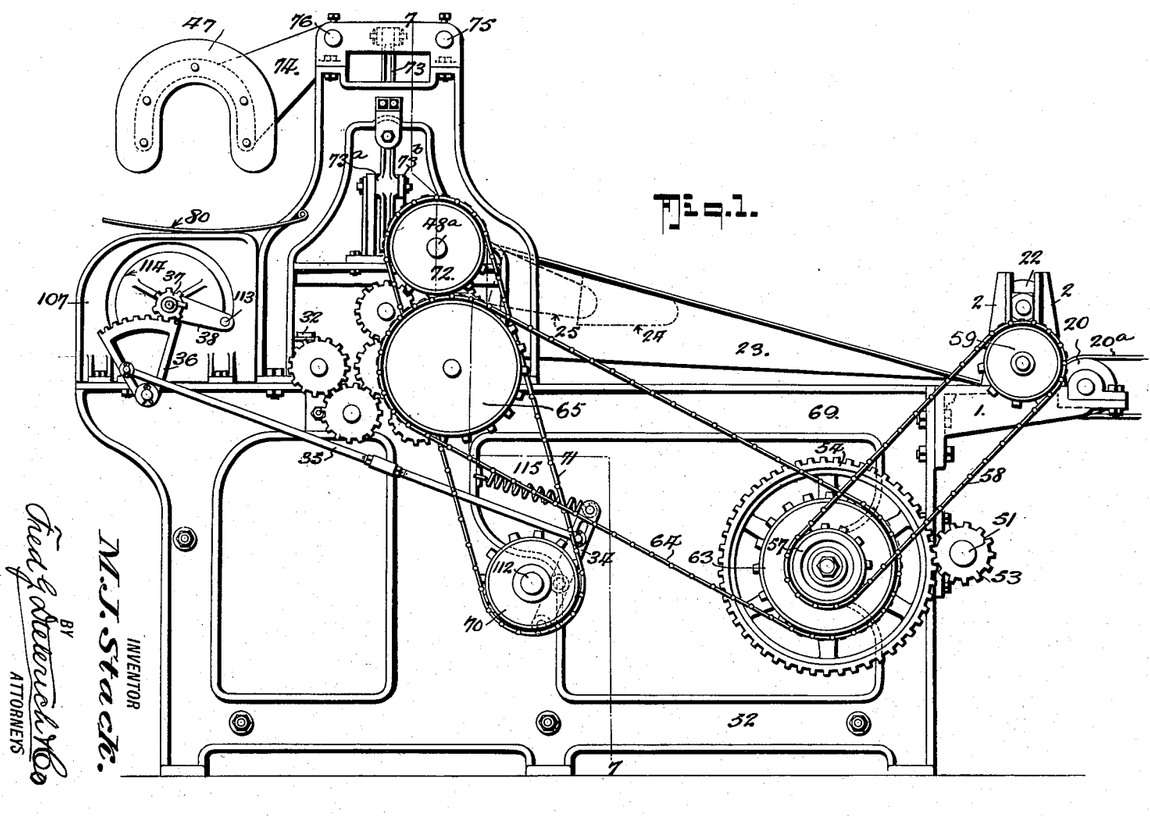
Figure 1 is a right hand elevation of my improved machine.

Motion is imparted to the bat feeding rolls 26—27 from the driven shaft 51 with gear 53, through a gear 54 on a stub shaft mounted on side frame 52, that carries sprocket gears 57 and 63, one of which 57, through chain 58, drives a gear 59, on shaft of the infeed roller 21, and the other 63, through a drive chain belt 64 drives the sprocket gear 65 on the shaft of roller 27, as is clearly shown in Fig. 1.

What I claim is:

1. In a machine of the character described, the combination with a bat rolling up means, including a roller on which the bat is wound, an ejector that includes a member for engaging and moving the accumulated bat on the roll to strip the said bat from off the roll and means controlled by power transmission that operates to wind up the bat, for determining the intervals between each operation of the bat rolling up means and the bat roll ejecting means.

2. In a machine of the character described, the combination with a bat rolling up means, including a roller on which the bat is wound, an ejector that includes a member for engaging and moving the accumulated bat on the roll to strip the said bat from off the roll and means controlled by power transmission that operates to wind up the bat, for determining the intervals between each operation of the bat rolling up means and the bat roll ejecting means, the said means including an adjustable timing device that regulates the last mentioned said means for controlling the operation of the bat winding and bat ejecting means at predetermined times.

3. In a machine of the character stated, the combination with means for rolling up a cotton bat, conveyer devices for feeding the bat stock to the said means, an ejector, a bat cutter, devices for receiving the cut end of the bat and feeding it up to the rolling up means, mechanism for bringing the roll of batting in position to be engaged by the ejector, and other mechanism for operating with the aforesaid parts for actuating them at predetermined times, said other mechanism including a timing device for adjusting it to thereby vary the predetermined times the aforesaid parts are actuated according to the weight of the bat roll to be wound.

4. In a machine of the character described, the combination with a bat sheet, a prime mover for continually feeding the sheet forward, a bat rolling mechanism that receives the said continually moving bat sheet, said rolling mechanism including a winding roll, means for severing the continually moving bat, means for removing the severed bat length when wound into a roll and other means including a driver in gear with the prime mover, said means being coöperatively connected with the bat severing, winding and ejecting means, and adapted to effect the successive operations of the said severing, winding up and ejecting means, at predetermined times, while the bat stock is being continually fed to the machine.

5. In a machine of the character described, means for effecting a continuous travel of the bat stock into the machine, a bat severing means for cutting the bat into the desired lengths to be rolled up, means for first winding up the cut end of the bat and then removing the rolled up bat, the said severing, rolling up and bat removing means being operated from the prime mover as the bat stock continues in its infeed to the machine and automatically operated devices for timing the said successive operations.

6. In a machine of the character described, means including a prime mover for continuously feeding the bat to be operated on into the machine, a severing means that cuts off the bat lengths to be rolled up, a winding roll, means for feeding the severed end of the said roll, means for ejecting the wound bat end from the winding roll, an intermittently operating mechanism that includes a driven shaft and automatically shiftable gear connections that connects the said driven shaft with the prime mover and which intermittently brings into action the intermittently operating mechanism, said intermittently operating mechanism being coöperatively connected with the bat severing, winding and ejecting means and adapted to successively actuate the said means as the bat stock continues in its travel toward the bat winding roll.

7. In a machine of the character described, means including a prime mover for continuously feeding the bat to be operated on into the machine, a severing means that cuts off the bat lengths to be rolled up, a winding roll, means for feeding the severed end of the said roll, means for ejecting the wound bat end from the winding roll, an intermittently operating mechanism that includes a driven shaft and automatically shiftable gear connections that connects the said driven shaft with the prime mover and which intermittently brings into action the intermittently operating mechanism, said intermittently operating mechanism being coöperatively connected with the bat severing, winding and ejecting means and adapted to successively actuate the said means as the bat stock continues in its travel toward the bat winding roll, said automatically shifting gear connections including an adjustable timing device for regulating the predetermined time that the said connection actuates according to the weight of the bat length to be rolled up.

8. In a machine of the character described, a bat rolling mechanism that includes a winding roll, means for conveying the bat to be rolled up to the said winding roll, means for ejecting the rolled up bat from the roll and mechanism including a timing device for operating the ejecting mechanism and for timing the said operation in accordance with the weight of the wound roll.

9. In a machine of the character described, a bat rolling mechanism, means including a prime mover for feeding the bat toward the rolling mechanism, a bat severing means that operates to cut off the length of the bat to be engaged by the rolling mechanism, means for removing the rolled bat from the rolling mechanism, and other mechanism intermittently actuated from the prime mover for successively operating the bat severing, the bat rolling and the bat removing means at predetermined intervals.

10. In a machine of the character described, a bat rolling mechanism, means including a prime mover for feeding the bat toward the rolling mechanism, a bat severing means that operates to cut off the length of the bat to be engaged by the rolling mechanism, means for removing the rolled bat from the rolling mechanism, and other mechanism intermittently actuated from the prime mover for successively operating the bat severing, the bat rolling and the bat removing means at predetermined intervals, and an adjustable automatically operable timing device for regulating the time the mechanism actuated from the prime mover is set in operation by transmission from the prime mover.

11. In a machine of the character described, a bat rolling up mechanism, means for continuously conveying a bat to the rolling up mechanism, means for severing the bat at intervals, means adjacent to the rolling up mechanism for starting the bat to the said mechanism, other means for ejecting the wound bat from the rolling up mechanism, and an automatically actuating device for regulating the time between the intervals when the bat severing and ejecting means are operated, whereby to provide for severing the bat into different lengths and to eject the said lengths when wound into a roll.

12. In a bat rolling machine of the character described, the combination with means for continuously conveying a bat in one direction and a shaft driven from the conveyer driving power; of a bat severing means comprising a vertically reciprocal cutting blade, guides just above the passing bat through which the blade passes as it engages and severs the bat, the said guides operating as wipers to clear the severed front end of the incoming bat from the cutter blade and means operable by the driven shaft for moving the cutter to its bat severing position.

13. In a bat rolling machine of the character described, the combination with means for continuously conveying a bat in one direction and a shaft driven from the conveyer driving power; of a bat severing means comprising a vertically reciprocal cutting blade, guides just above the passing bat through which the blade passes as it engages and severs the bat, the said guides operating as wipers to clear the severed front end of the incoming bat from the cutter blade and means operable by the driven shaft for moving the cutter to its bat severing position, and spring elements for lifting the cutter back to its normal position.

14. In a machine of the character described, a bat rolling mechanism, means for continuously feeding the bat toward the said rolling mechanism, means for severing the bat at intervals and which include a reciprocal plunger blade and means for applying increased tension to that part of the bat to be engaged by the said plunger blade.

15. In a machine of the character described, a bat rolling mechanism, means for continuously feeding the bat toward the said rolling mechanism, means for severing the bat at intervals and which include a reciprocal plunger blade and means for applying increased tension to that part of the bat to be engaged by the said plunger blade, said means including a pair of infeed rollers located in advance of the severing line and a pair of outfeed rollers located beyond the said cutting line, the said rollers engaging the bat and means for imparting a greater speed of rotation to the outfeed rollers than to the infeed rollers.

16. In a machine of the character described, a bat rolling mechanism, means for continuously feeding the bat toward the said rolling mechanism, means for severing the bat at intervals and which include a reciprocal plunger blade and means for applying increased tension to that part of the bat to be engaged by the said plunger blade, said means including a pair of infeed rollers located in advance of the severing line and a pair of outfeed rollers located beyond the said cutting line, the said rollers engaging the bat and means for imparting a greater speed of rotation to the outfeed rollers than to the infeed rollers, and a conveyer that receives the severed bat end and conveys it to the rolling up mechanism.

17. In a machine of the character described, mechanism for continuously moving a bat in one direction, a bat severing mechanism, a bat receiving and rolling up mechanism, a timing mechanism for bringing said bat severing and rolling mechanism into operation, the said timing mechanism including an adjustable element for changing the intervals of action to provide for cutting bats of different predetermined lengths.

18. In a machine of the character described, mechanism for continuously moving a bat in one direction, a bat severing mechanism, a bat receiving and rolling up mechanism, an ejecting mechanism, a timing mechanism for bringing said bat severing and rolling mechanism into operation, the said timing mechanism including an adjustable element for changing the intervals of action to provide for cutting bats of different predetermined lengths.

19. In a machine of the character described, mechanism for continuously moving a bat in one direction, a bat severing mechanism, a bat receiving and rolling up mechanism, an ejecting mechanism, a timing mechanism for bringing said bat severing and rolling mechanism into operation, the said timing mechanism including an adjustable element for changing the intervals of action to provide for cutting bats of different predetermined lengths, said adjustable element having provision whereby it may be adjusted without interrupting the continuous feeding of the bat.

20. In a machine of the character described, bat moving devices, a cutting mechanism for severing the bat into sections, an intermittently operated device for setting said cutting mechanism into action, and a timer operating with the said device for controlling the duration of action of the same.

21. In a machine of the character described, bat moving devices, a cutting mechanism for severing the bat into sections, an intermittently operated device for setting said cutting mechanism into action, a timer operating with the said device for controlling the duration of action of the same, said timer including a movable trip member having an operative stroke between predetermined limits and means for varying the limit of operation.

22. In a machine of the character stated, means for continuously feeding a cotton bat on one direction, a bat winding mechanism, a cutting mechanism operating to sever the bat to provide the length of the bat to be wound, a conveyer for feeding the severed bat length to the winding mechanism, means for removing the wound bat, a controlling mechanism including a driven shaft and power transmission that connects with the bat driving means, an automatically operated means for intermittently connecting the power transmission with the driven shaft to thereby successively set in operation the bat cutting means, the winding up mechanism and the bat removing means.

23. In a machine of the character stated, means for continuously feeding a cotton bat in one direction, a bat winding mechanism, a cutting mechanism operating to sever the bat to provide the length of the bat to be wound, a conveyer for feeding the severed bat length to the winding mechanism, means for removing the wound bat, a controlling mechanism including a driven shaft and power transmission that connects with the bat driving means, an automatically operated means for intermittently connecting the power transmission with the driven shaft to thereby successively set in operation the bat cutting means, the winding up mechanism and the bat removing means, said automatically operated means including an adjustable timing device for determining the length of time between the intermittent connections thereof with the said driving shaft according to the length of the bat section being wound.

MAURICE J. STACK.

Copies of this patent may be obtained for five cents each, by addressing the "Commissioner of Patents, Washington, D. C."